(12) United States Patent
Sakamoto

(10) Patent No.: US 8,994,268 B2
(45) Date of Patent: Mar. 31, 2015

(54) STROBE DEVICE

(75) Inventor: Arata Sakamoto, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 0 days.

(21) Appl. No.: 14/234,677

(22) PCT Filed: Aug. 6, 2012

(86) PCT No.: PCT/JP2012/004973
§ 371 (c)(1),
(2), (4) Date: Jan. 24, 2014

(87) PCT Pub. No.: WO2013/021611
PCT Pub. Date: Feb. 14, 2013

(65) Prior Publication Data
US 2014/0167596 A1    Jun. 19, 2014

(30) Foreign Application Priority Data

Aug. 8, 2011    (JP) .................................. 2011-172785

(51) Int. Cl.
*H01J 17/44* (2006.01)
*H01J 61/54* (2006.01)
(Continued)

(52) U.S. Cl.
CPC . *H01J 7/30* (2013.01); *G03B 15/05* (2013.01); *G03B 2215/0578* (2013.01); *G03B 2215/0532* (2013.01)
USPC ............ 313/594; 313/234; 313/325; 313/607

(58) Field of Classification Search
CPC ........... H01J 35/22; H01J 61/80; H01J 61/90; H01J 7/30; G03B 2215/0582; G03B 2215/0578; G03B 15/05
USPC .................................. 313/325, 234, 594, 607
See application file for complete search history.

(56) References Cited

U.S. PATENT DOCUMENTS

| | | | |
|---|---|---|---|
| 3,939,379 A * | 2/1976 | Sullivan et al. | 315/85 |
| 5,999,751 A | 12/1999 | Imamura et al. | |
| 2005/0007030 A1* | 1/2005 | Ina et al. | 315/241 P |
| 2013/0215592 A1* | 8/2013 | Yoneya et al. | 362/16 |

(Continued)

FOREIGN PATENT DOCUMENTS

| | | |
|---|---|---|
| JP | 05-232551 A | 9/1993 |
| JP | 10-161204 A | 6/1998 |

(Continued)

OTHER PUBLICATIONS

International Search Report for Application No. PCT/JP2012/004973, dated Sep. 18, 2012.

*Primary Examiner* — Anne Hines
*Assistant Examiner* — Jose M Diaz
(74) *Attorney, Agent, or Firm* — RatnerPrestia

(57) ABSTRACT

A compact strobe device includes the following components: a flash discharge tube having an anode and a cathode; a conductive reflector storing a part of the flash discharge tube; a trigger coil having a hollow core, and a primary winding and a secondary winding around the core; and a conductor connecting the secondary winding of the trigger coil and the reflector. The trigger coil has an end of the flash discharge tube inserted into the core, and includes at an end thereof adjacent to the reflector, a secondary terminal connected to the secondary winding. The reflector has a bottom in contact with the outer peripheral surface of the flash discharge tube, the outer peripheral surface covering at least the region extending from the anode to the cathode. The conductor has a first contact portion in contact with the secondary terminal of the trigger coil, and a second contact portion in contact with the bottom of the reflector.

6 Claims, 7 Drawing Sheets

(51) Int. Cl.
*H01J 7/30* (2006.01)
*G03B 15/05* (2006.01)

(56) References Cited

U.S. PATENT DOCUMENTS

2013/0250542 A1* 9/2013 Man ................................ 362/6
2014/0001947 A1* 1/2014 Tsuchida ..................... 313/113

FOREIGN PATENT DOCUMENTS

| JP | 10-186466 | A | | 7/1998 | |
|----|-----------|---|---|--------|---|
| JP | 11-167147 | A | | 6/1999 | |
| JP | 11218808 | A | * | 8/1999 | ............. G03B 15/05 |
| JP | 2002-198197 | A | | 7/2002 | |
| JP | 2004-334100 | A | | 11/2004 | |
| JP | 2004-341440 | A | | 12/2004 | |

* cited by examiner

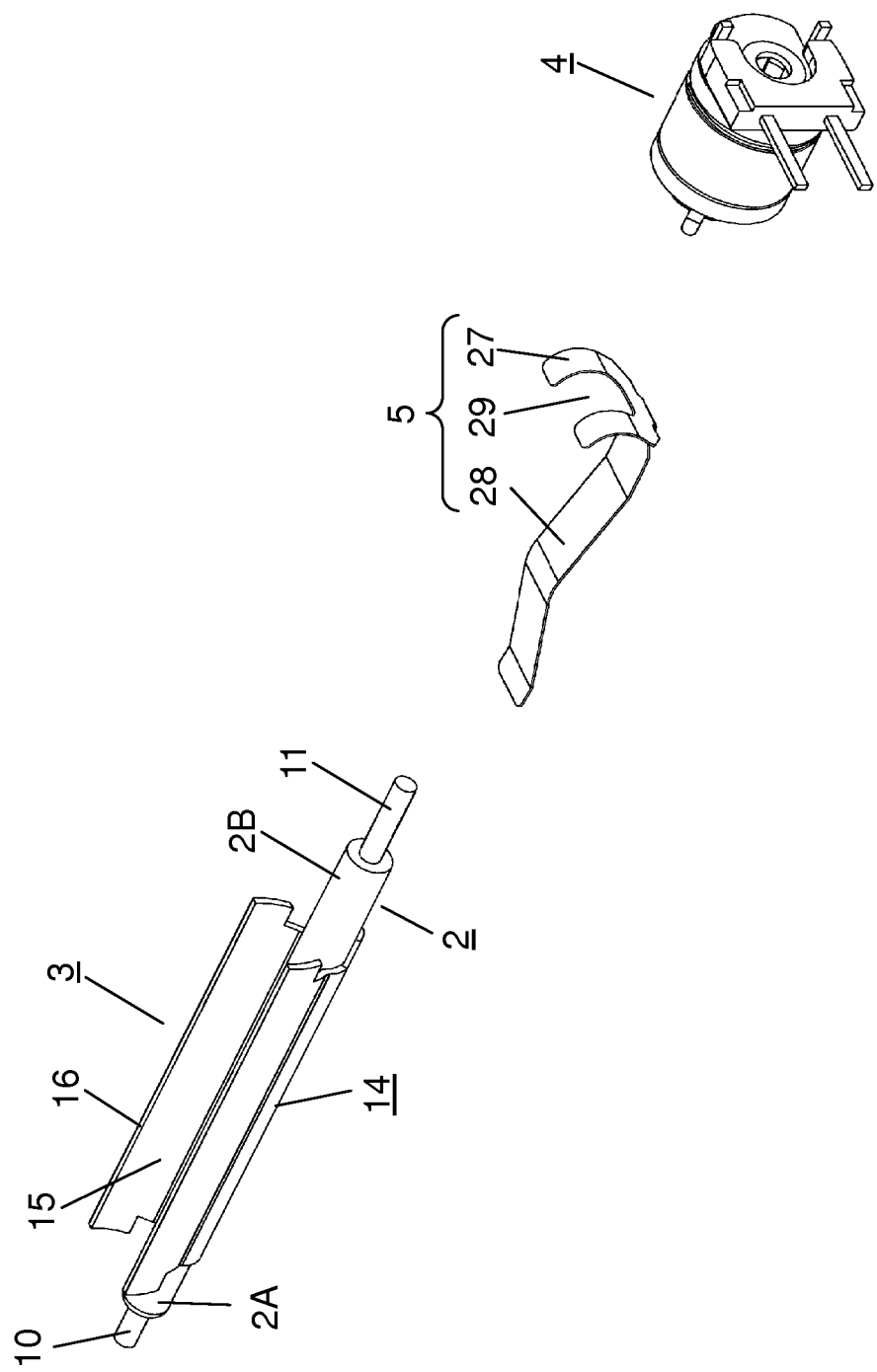

STROBE DEVICE

This application is a U.S. National Phase Application of PCT International Application PCT/JP2012/004973.

TECHNICAL FIELD

The present invention relates to a strobe device used for taking pictures or other purposes.

BACKGROUND ART

Conventional well-known strobe devices include the following components: a flash discharge tube having an anode on one side and a cathode on the other side; a reflector storing a part of the flash discharge tube; and a trigger coil having a cylindrical core and primary winding and secondary winding wound around the core.

In the above strobe devices, the trigger coil is disposed near the reflector, and the trigger coil has a secondary terminal (output terminal), which is in contact with the reflector (see, for example, Patent Literatures 1 and 2). According to these Patent Literatures, this configuration eliminates the need to provide a lead wire connecting the reflector and the trigger coil, thereby eliminating illumination failure due to the imperfect contact of the lead wire.

In the strobe device of Patent Literature 1, the trigger coil is disposed behind the reflector, whereas in the strobe device of Patent Literature 2, the trigger coil is disposed under the reflector.

Because of these arrangements, the strobe devices of Patent Literatures 1 and 2 are far from being compact.

CITATION LIST

Patent Literature

Patent Literature 1: Japanese Unexamined Patent Publication No. H10-186466
Patent Literature 2: Japanese Unexamined Patent Publication No. 2004-334100

SUMMARY OF THE INVENTION

The present invention is directed to provide a strobe device including the following components: a flash discharge tube having an anode on one side thereof and a cathode on the other side thereof; a conductive reflector composing a trigger external electrode, which is in in contact with a part of the flash discharge tube and stores the part; a trigger coil having a hollow core, and a primary winding and a secondary winding wound around the core; and a conductor connecting the secondary winding of the trigger coil and the reflector. The trigger coil has an end of the flash discharge tube inserted into the core, and includes, at an end thereof adjacent to the reflector, a secondary terminal connected to the secondary winding. The reflector has a bottom in contact with the outer peripheral surface of the flash discharge tube, the outer peripheral surface covering at least the region extending from the anode to the cathode. The conductor has a first contact portion in contact with the secondary terminal of the trigger coil, and a second contact portion in contact with the bottom of the reflector.

This configuration provides a compact and thin strobe device.

BRIEF DESCRIPTION OF DRAWINGS

FIG. 4 is an exploded perspective view of an essential part of the strobe device according to the exemplary embodiment.

DESCRIPTION OF EMBODIMENT

A strobe device according to an exemplary embodiment of the present invention will now be described with reference to drawings. Note that the present invention is not limited to the following exemplary embodiment.

EXEMPLARY EMBODIMENT

The strobe device according to the exemplary embodiment of the present invention will now be described with reference to FIGS. 1 to 7B.

First, the schematic configuration of the strobe device of the exemplary embodiment of the present invention will be described with reference to FIGS. 1 to 3.

Figure 1:
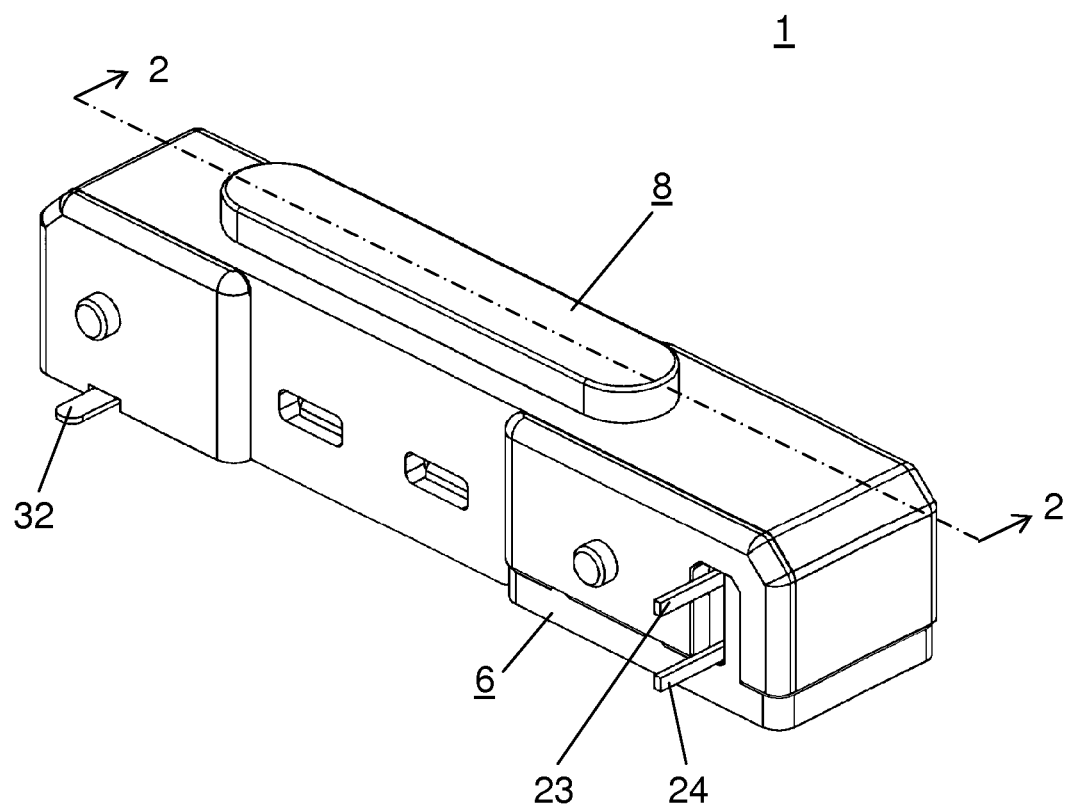
FIG. 1 is a perspective view of a strobe device according to an exemplary embodiment of the present invention.

FIG. 1 is a perspective view of the strobe device according to the exemplary embodiment. FIG. 2 is a sectional view of the strobe device according to the exemplary embodiment taken along line 2-2 of FIG. 1. FIG. 3 is an exploded perspective view of the strobe device according to the exemplary embodiment.

As shown in FIG. 1, strobe device 1 of the exemplary embodiment includes base 6, and optical panel 8 engaged with base 6. Strobe device 1 further includes primary terminal 23 and common terminal 24 of a trigger coil (not shown), and anode terminal 32, all of which are external terminals projecting outside strobe device 1.

Figure 2:
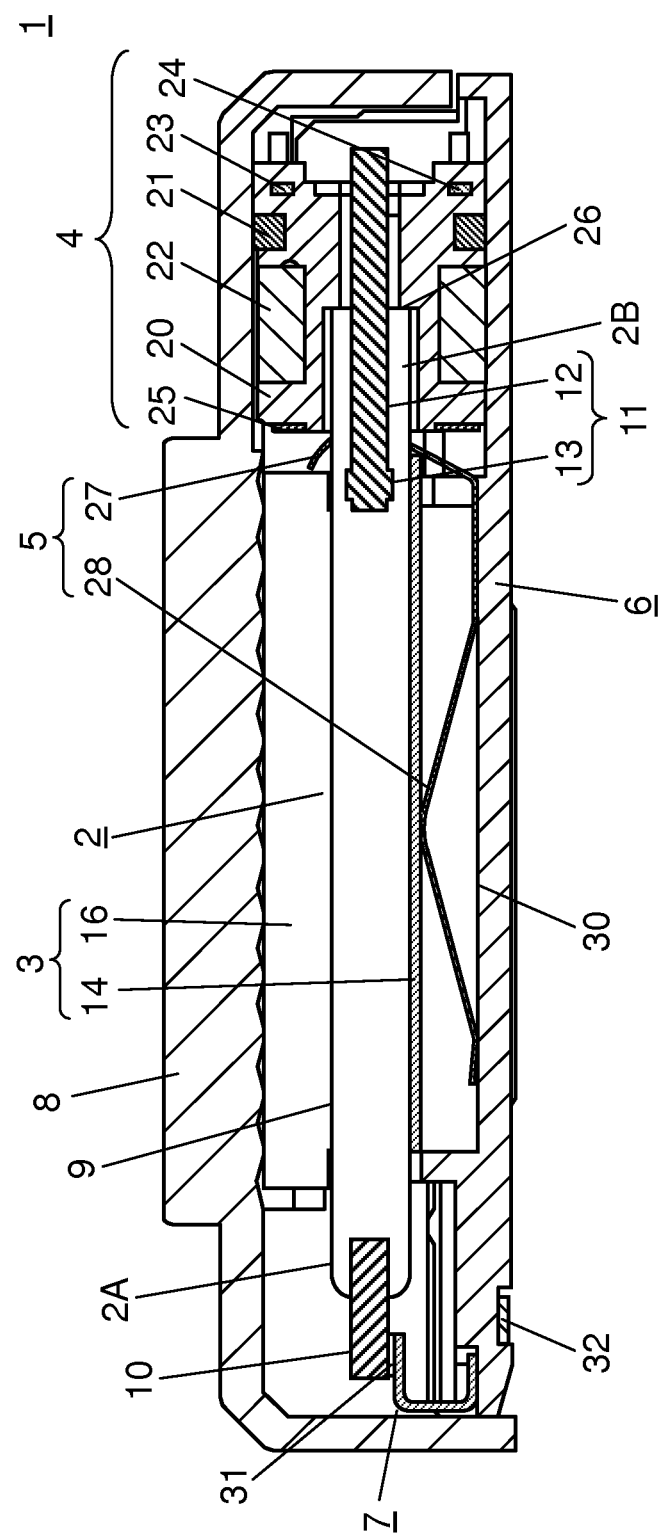
FIG. 2 is a sectional view of the strobe device according to the exemplary embodiment taken along line 2-2 of FIG. 1.
Figure 3:
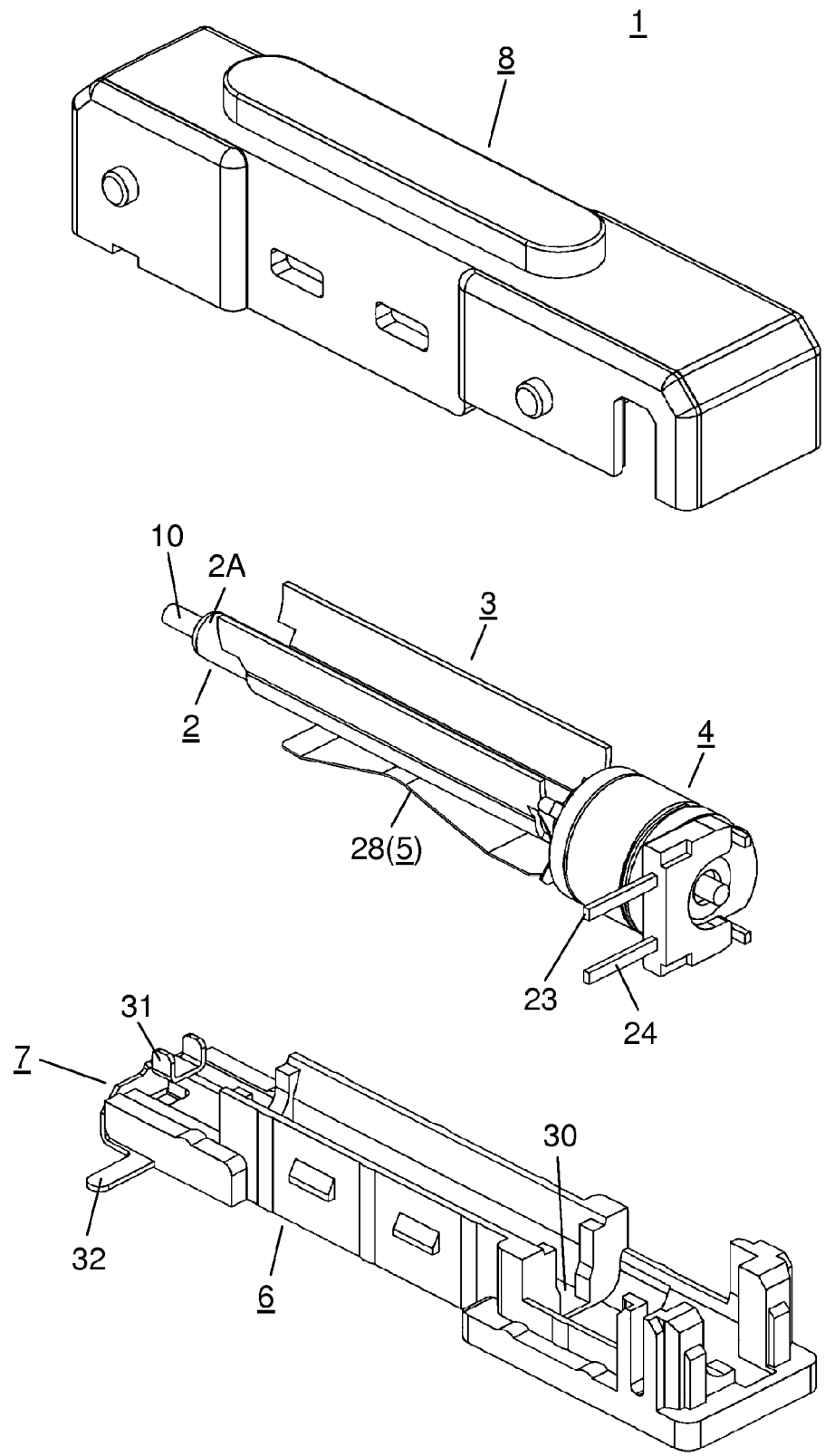
FIG. 3 is an exploded perspective view of the strobe device according to the exemplary embodiment.

As shown in FIGS. 2 and 3, strobe device 1 of the exemplary embodiment stores at least flash discharge tube 2 for emitting light, conductive reflector 3, trigger coil 4, and conductor 5. Reflector 3 stores a part of flash discharge tube 2, thereby functioning as a trigger external electrode of flash discharge tube 2. Trigger coil 4 is disposed on other side 2B of flash discharge tube 2 in such a manner that primary terminal 23 and common terminal 24 project outside strobe device 1. Conductor 5 electrically connects reflector 3 and trigger coil 4.

Base 6 is made of an insulating material such as polycarbonate. As shown in FIG. 3, base 6 includes holding portion 30 for holding below-described second contact portion 28 of conductor 5 so as to store reflector 3. Base 6 also includes fixing part 7 for fixing one side 2A of flash discharge tube 2 to base 6. Fixing part 7 has connecting portion 31 which is configured to be connected to anode 10 of flash discharge tube 2, and plate-shaped anode terminal 32 which is electrically connected to connecting portion 31 and is projecting as an external terminal. Connecting portion 31 is bonded by, for example, soldering to anode 10 of flash discharge tube 2.

Optical panel 8, which is made of a light transmitting material such as PMMA, covers reflector 3 so as to store it.

As shown in FIG. 2, flash discharge tube 2 includes tubular glass bulb 9, anode 10 disposed on one side 2A, and cathode 11 disposed on other side 2B. Glass bulb 9 is filled with a rare gas such as xenon at a predetermined pressure. When electrons collide with the rare gas, flash discharge tube 2 generates and emits light to illuminate a subject. Anode 10 is a bar-shaped electrode made, for example, of tungsten. Anode 10 is inserted into glass bulb 9 and fixed at one side 2A by being melted with glass beads (not shown). Cathode 11 is formed of bar-shaped electrode 12 and metal sintered body 13. Bar-shaped electrode 12 is made, for example, of tungsten, and is inserted into glass bulb 9 and fixed at other side 2B by being melted with glass beads (not shown). Metal sintered body 13 is made of a mixture of metal fine powder, such as a mixture of tungsten and tantalum or a mixture of tantalum and nickel. Metal sintered body 13 is fixed to bar-shaped electrode 12 at the end inside glass bulb 9.

The following is a detailed description, with reference to FIGS. 5A to 7B, of the configuration of reflector 3 and trigger coil 4 of strobe device 1 according to the exemplary embodiment.

Figure 5A:
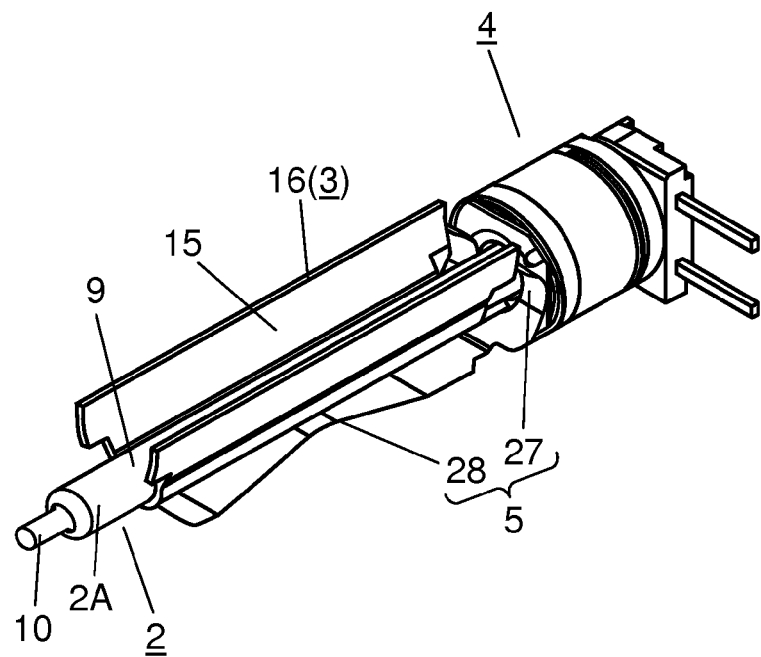
FIG. 5A is a perspective view of the essential part of the strobe device according to the exemplary embodiment.
Figure 5B:
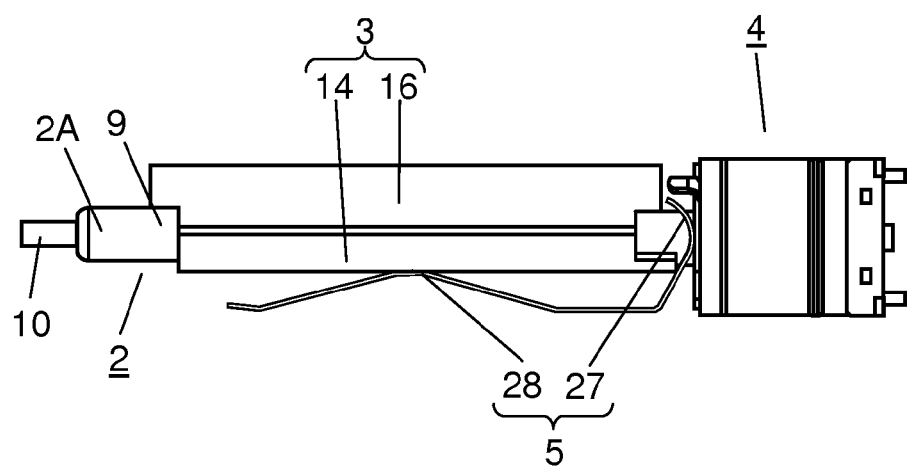
FIG. 5B is a front view of the essential part of the strobe device according to the exemplary embodiment.
Figure 6A:
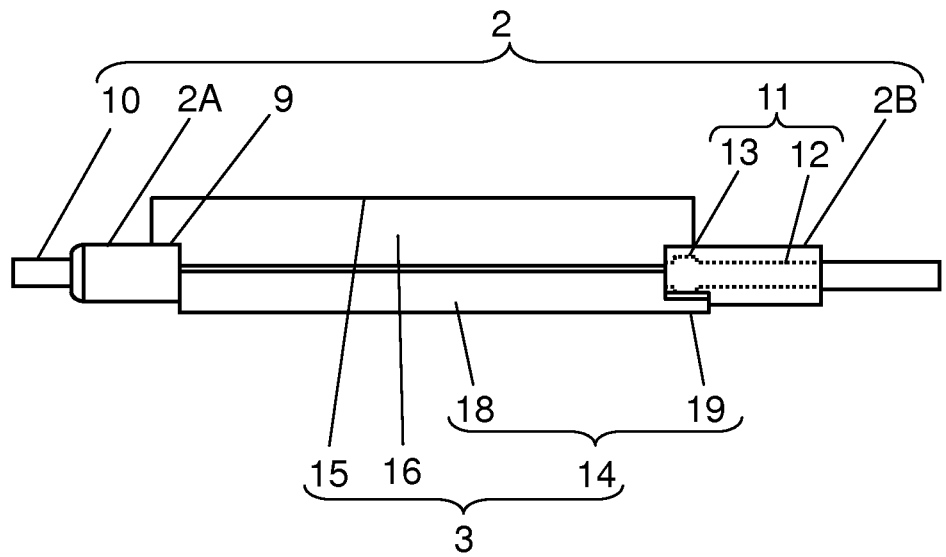
FIG. 6A is a front view showing the arrangement of a flash discharge tube and a reflector of the strobe device according to the exemplary embodiment.
Figure 6B:
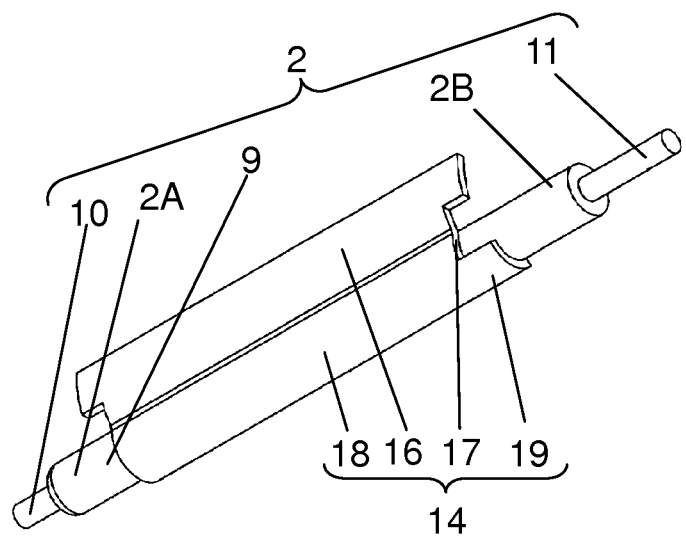
FIG. 6B is a perspective view showing the arrangement of the flash discharge tube and the reflector of the strobe device according to the exemplary embodiment.
Figure 7A:
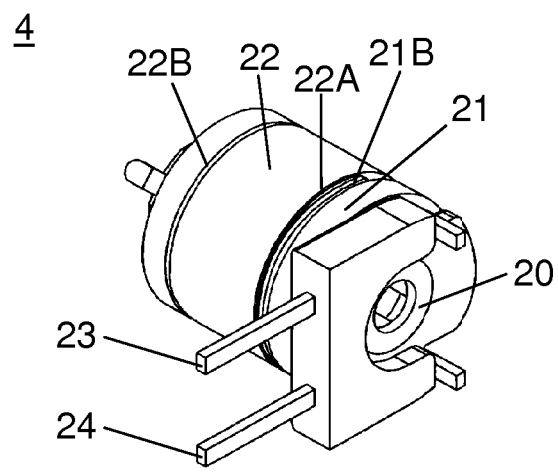
FIG. 7A is a perspective view of a trigger coil of the strobe device according to the exemplary embodiment.
Figure 7B:
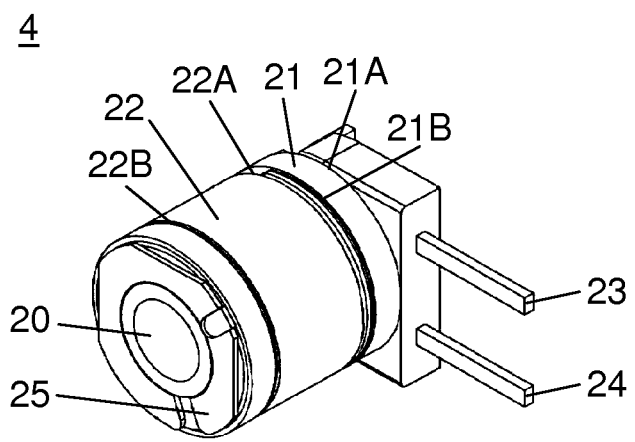
FIG. 7B is a perspective view of the trigger coil of the strobe device according to the exemplary embodiment viewed in a different direction.

FIG. 5A is a perspective view of the essential part of the strobe device according to the exemplary embodiment. FIG. 5B is a front view of the essential part of the strobe device according to the exemplary embodiment. FIGS. 6A and 6B are a front view and a perspective view, respectively, showing the arrangement of the flash discharge tube and the reflector of the strobe device according to the exemplary embodiment. FIGS. 7A and 7B are perspective views of the trigger coil of the strobe device viewed in different directions from each other according to the exemplary embodiment.

As shown in FIGS. 5A to 6B, reflector 3 has bottom 14, opening 15, side reflective portion 16, and recessed installation portion 17. Bottom 14 of reflector 3 is configured to be in contact with the outer peripheral surface of flash discharge tube 2. This allows reflector 3 to function as a trigger external electrode of flash discharge tube 2. Opening 15 passes the light emitted from flash discharge tube 2 to the outside. Side reflective portion 16 reflects the light emitted from flash discharge tube 2 toward opening 15. Installation portion 17 stores flash discharge tube 2.

Bottom 14 of reflector 3 is formed of base portion 18 and extension 19. Base portion 18 is configured to be in contact with the outer peripheral surface of flash discharge tube 2 so as to cover the region extending from anode 10 to cathode 11. Base portion 18 has a shape of an arc having substantially (or exactly) the same radius as glass bulb 9 so that base portion 18 can be in surface contact with the outer peripheral surface of glass bulb 9. This configuration allows base portion 18 to function as a reflective plate for reflecting the light emitted from flash discharge tube 2, and also as a trigger external electrode of flash discharge tube 2.

Extension 19 extends from base portion 18 of bottom 14 toward other side 2B of flash discharge tube 2 in the axial (longitudinal) direction so as to be in contact with the outer peripheral surface of flash discharge tube 2, thereby covering metal sintered body 13 of cathode 11. Extension 19 has a shape of an arc having substantially (or exactly) the same radius as glass bulb 9 so as to be in surface contact with the outer peripheral surface of glass bulb 9. This configuration allows extension 19 to function as a trigger external electrode of flash discharge tube 2 in the same manner as base portion 18.

As shown in FIGS. 7A and 7B, trigger coil 4 includes hollow cylindrical core 20, and primary winding 21 and secondary winding 22 wound around core 20. Core 20 is formed of a magnetic body such as ferrite. As shown in FIG. 2, primary winding 21 is on the other side (on the primary terminal 23 side) of core 20 of trigger coil 4, whereas secondary winding 22 is on one side of core 20 of trigger coil 4, that is, on the side adjacent to reflector 3 opposite to core 20. One end 22A of secondary winding 22 is connected to other end 21B of primary winding 21.

Trigger coil 4 further includes primary terminal 23 connected to one end 21A of primary winding 21; common terminal 24 connected to other end 21B of primary winding 21 and to one end 22A of secondary winding 22; and secondary terminal 25 connected to other end 22B of secondary winding 22. Common terminal 24 is electrically connected also to cathode 11 of flash discharge tube 2.

As best shown in FIGS. 1 and 5A, primary terminal 23 and common terminal 24 of trigger coil 4 are bar-shaped, projecting to the outside and are connected as external terminals to, for example, an external driving circuit (not shown). Secondary terminal 25, on the other hand, has an annular plate shape and is disposed at an end of trigger coil 4 (in the axial direction of core 20), that is, the end adjacent to reflector 3 as shown in FIG. 7B.

As shown in FIG. 2, hollow core 20 has locking member 26 for positioning flash discharge tube 2 in the axial (longitudinal) direction. Locking member 26 projects inside in the radial direction of core 20, thereby locking the end of flash discharge tube 2 on other side 2B. In core 20, a portion of bar-shaped electrode 12 on other side 2B leading up to metal sintered body 13 of cathode 11 melted after being inserted into glass bulb 9 on other side 2B of flash discharge tube 2 is inserted until reaching locking member 26. Thus, the portion of cathode 11 not including metal sintered body 13 can be surely inserted into core 20 of trigger coil 4.

Next, the configuration of conductor 5 of strobe device 1 according to the exemplary embodiment will now be described in detail based on FIG. 4 with reference to FIGS. 2 and 5B.

FIG. 4 is an exploded perspective view of the essential part of the strobe device according to the exemplary embodiment.

As shown in FIG. 4, conductor 5 includes first contact portion 27, and second contact portion 28 connected to first contact portion 27, both of which are, for example, plate-shaped. First contact portion 27 is configured to be in contact with secondary terminal 25 of trigger coil 4, whereas second contact portion 28 is configured to be in contact with bottom 14 of reflector 3. This configuration establishes an electrical connection between secondary terminal 25 of trigger coil 4 and bottom 14 of reflector 3 via conductor 5.

First contact portion 27 of conductor 5 has insertion portion 29 of, for example, a substantial (or exact) U shape so as to pass flash discharge tube 2 through it and into trigger coil 4. First contact portion 27 of conductor 5 has a curved shape such as an arc, and the convex portion of the curve is in contact with secondary terminal 25 of trigger coil 4.

Second contact portion 28 of conductor 5, on the other hand, has a belt shape extending in the axial (longitudinal) direction of flash discharge tube 2 and is curved like an arc protruding toward bottom 14 of reflector 3.

As shown in FIG. 2, trigger coil 4 is inserted into other side 2B of flash discharge tube 2 through conductor 5, and flash discharge tube 2 stored in reflector 3 is laid between base 6 and optical panel 8. As a result, second contact portion 28 of conductor 5 elastically deforms between bottom 14 of reflector 3 and base 6. Because of the restoring force (biasing force) due to the elastic deformation of second contact portion 28 of conductor 5, second contact portion 28 can be in contact with bottom 14 of reflector 3, and flash discharge tube 2 and other components can be held in base 6 and optical panel 8.

As described above, base 6 includes holding portion 30 for holding second contact portion 28. Holding portion 30 sandwiches second contact portion 28 between bottom 14 of reflector 3 and itself.

The strobe device of the exemplary embodiment is configured as described above. The operation and action of strobe device 1 of the exemplary embodiment will now be described as follows.

First, a driving voltage is applied from an external driving circuit (not shown) to anode 10 and cathode 11 of flash discharge tube 2 via anode terminal 32 and common terminal 24, which are external terminals of strobe device 1.

At the same time as the application of the voltage or after a predetermined amount of time, a pulse-like voltage is applied from the external driving circuit (not shown) to primary winding 21 of trigger coil 4 via primary terminal 23 and common terminal 24, which are external terminals of strobe device 1. The voltage applied to primary winding 21 is, for example, boosted at secondary winding 22. The boosted voltage is applied as a trigger pulse to bottom 14 of reflector 3 from secondary terminal 25 of trigger coil 4 via first and second contact portions 27 and 28 of conductor 5.

This activates and ionizes the rare gas filled in glass bulb 9 near the inner periphery of glass bulb 9 which is in contact with base portion 18 and extension 19 of bottom 14 of reflector 3.

Cathode 11 also emits electrons toward anode 10 so as to promote the ionization of the rare gas, making the rare gas more conductive. This causes a sudden large current flow from anode 10 to cathode 11, allowing flash discharge tube 2 to emit light to illuminate the outside.

At this moment, the trigger pulse is applied also to extension 19 of bottom 14 of reflector 3 covering metal sintered body 13 of cathode 11. The pulse application allows electrons emitted from cathode 11 to stably form a discharge path starting from the vicinity of cathode 11. This reduces variations in the amount of light emitted from flash discharge tube 2, thereby irradiating the subject in a stable manner.

The present invention is not limited to the above-described exemplary embodiment and can be properly changed within the range not deviating from the spirit of the present invention. It also goes without saying that the configuration and methods of the following various modified examples can be arbitrary selected and adopted into the above-described exemplary embodiment.

For example, flash discharge tube 2 has no thin-film transparent electrode on its surface in the exemplary embodiment, but may alternatively have a thin-film transparent electrode such as an ITO or NESA film formed thereon. In this case, too, at least the region extending from anode 10 to cathode 11 of flash discharge tube 2, and metal sintered body 13 can be covered by bottom 14 of reflector 3, which is in contact with the outer peripheral surface of the glass bulb of flash discharge tube 2 having the thin-film transparent electrode formed thereon. This reduces variations in the amount of light emitted from flash discharge tube 2, thereby irradiating the subject in a stable manner.

Extension 19 of reflector 3 is arc-shaped in the exemplary embodiment, but may alternatively be, for example, flat-shaped. In this case, too, the discharge path of the electrons emitted from cathode 11 can be formed stably from the vicinity of cathode 11.

First contact portion 27 of conductor 5 is a substantial U shape with insertion portion 29 inside in the exemplary embodiment, but may alternatively be, for example, a ring shape, that is, a substantial (or exact) O shape with insertion portion 29 as an opening in the center. This improves the accuracy of positioning first contact portion 27 relative to flash discharge tube 2.

Second contact portion 28 of conductor 5 is curved like an arc in the longitudinal direction in the exemplary embodiment, but may alternatively have, for example, a plurality of peaks and troughs in the longitudinal direction, that is, corrugated. This configuration improves the contact between bottom 14 of reflector 3 and glass bulb 9 of flash discharge tube 2.

As described hereinbefore, strobe device 1 of the present invention includes flash discharge tube 2 having anode 10 on one side thereof and cathode 11 on the other side thereof; conductive reflector 3 composing a trigger external electrode, which is in contact with a part of flash discharge tube 2 and stores the part; trigger coil 4 having hollow core 20, and primary winding 21 and secondary winding 22 wound around core 20; and conductor 5 connecting secondary winding 22 of trigger coil 4 and reflector 3. Trigger coil 4 has an end of flash discharge tube 2 inserted into core 20, and includes, at an end thereof adjacent to reflector 3, secondary terminal 25 connected to secondary winding 22. Reflector 3 has bottom 14 in contact with the outer peripheral surface of flash discharge tube 2, the outer peripheral surface covering at least the region extending from anode 10 to cathode 11. Conductor 5 has first contact portion 27 in contact with secondary terminal 25 of trigger coil 4, and second contact portion 28 in contact with bottom 14 of reflector 3.

In this configuration, the end of flash discharge tube 2 is inserted into core 20 of trigger coil 4, and secondary terminal 25 electrically connected to secondary winding 22 is disposed at that end, which is adjacent to reflector 3, of trigger coil 4. This configuration allows strobe device 1 to be compact and thin.

Bottom 14 of reflector 3 is in contact with the outer peripheral surface of flash discharge tube 2 so as to cover at least the region extending from anode 10 to cathode 11 of flash discharge tube 2. First contact portion 27 of conductor 5 is in contact with secondary terminal 25 of trigger coil 4. Second contact portion 28 of conductor 5 connected to first contact portion 27 elastically deforms and holds bottom 14 of reflector 3 and flash discharge tube 2 in such a manner that reflector 3 and flash discharge tube 2 are in contact with each other. This ensures the electrical connection between secondary terminal 25 of trigger coil 4 and bottom 14 of reflector 3 via conductor 5. This also greatly reduces the connection distance between flash discharge tube 2 and secondary terminal 25, which outputs a trigger pulse. This configuration eliminates the power loss caused by the resistance of a lead wire used for connection as in the conventional strobe devices.

In strobe device 1 of the present invention, first contact portion 27 of conductor 5 includes insertion portion 29 into which flash discharge tube 2 is inserted, and second contact portion 28 of conductor 5 has a curved belt shape extending in the longitudinal direction of flash discharge tube 2.

In this configuration, flash discharge tube 2 is inserted into insertion portion 29 formed in first contact portion 27 of conductor 5, thereby allowing first contact portion 27 to be positioned relative to flash discharge tube 2. Furthermore, second contact portion 28 of conductor 5 is shaped like a belt extending along flash discharge tube 2 and is also curved in the longitudinal direction of flash discharge tube 2. As a result, second contact portion 28 of conductor 5 can elastically deform, allowing bottom 14 of reflector 3 to be held in contact with flash discharge tube 2.

In strobe device 1 of the present invention, cathode 11 of flash discharge tube 2 includes metal sintered body 13 at an end thereof.

In strobe device 1 of the present invention, flash discharge tube 2 is inserted at a portion thereof into core 20 of trigger coil 4, the portion being on the cathode 11 side of flash discharge tube 2 and not including metal sintered body 13.

In the strobe device of the present invention, bottom 14 of reflector 3 is disposed to further cover metal sintered body 13 of flash discharge tube 2.

Thus, metal sintered body 13 is formed at an end of cathode 11, and the portion of flash discharge tube 2 which does not contain metal sintered body 13 is inserted into core 20 of trigger coil 4. This configuration allows strobe device 1 to be compact and thin.

When a voltage is applied between anode 10 and cathode 11 of flash discharge tube 2, and a trigger pulse is applied to bottom 14 of reflector 3, a uniform electron flow is generated between anode 10 and cathode 11 of flash discharge tube 2. In this case, bottom 14 of reflector 3 which is in contact with the outer peripheral surface of flash discharge tube 2 covers not only the region extending from anode 10 to cathode 11, but also metal sintered body 13 of cathode 11. In this case, the discharge path of the electrons emitted from cathode 11 can be formed stably from the vicinity of cathode 11. This reduces variations in the amount of light emitted from flash discharge tube 2, thereby irradiating the subject in a stable manner.

INDUSTRIAL APPLICABILITY

The compact strobe device of the present invention is useful for irradiating a subject to take pictures of.

REFERENCE MARKS IN THE DRAWINGS 1 strobe device
2 flash discharge tube
2A one side
2B other side
3 reflector
4 trigger coil
5 conductor
6 base
7 fixing part
8 optical panel
9 glass bulb
10 anode
11 cathode
12 bar-shaped electrode
13 metal sintered body
14 bottom
15 opening
16 side reflective portion
17 installation portion
18 base portion
19 extension
20 core
21 primary winding
21A, 22A one end
21B, 22B other end
22 secondary winding
23 primary terminal
24 common terminal
25 secondary terminal
26 locking member
27 first contact portion
28 second contact portion
29 insertion portion
30 holding portion
31 connecting portion
32 anode terminal

The invention claimed is:

1. A strobe device comprising:
a flash discharge tube having an anode on one side thereof and a cathode on another side thereof;
a conductive reflector composing a trigger external electrode, the trigger external electrode being in contact with a part of the flash discharge tube and storing the part;
a trigger coil having a hollow core, and a primary winding and a secondary winding wound around the core; and
a conductor connecting the secondary winding of the trigger coil and the reflector,
wherein
the trigger coil has an end of the flash discharge tube inserted into the core, and includes, at an end thereof adjacent to the reflector, a secondary terminal connected to the secondary winding;
the reflector has a bottom in contact with an outer peripheral surface of the flash discharge tube, the outer peripheral surface covering at least a region extending from the anode to the cathode;
the conductor has a first contact portion in contact with the secondary terminal of the trigger coil, and a second contact portion in contact with the bottom of the reflector;
the first contact portion of the conductor includes an insertion portion into which the flash discharge tube is inserted; and
the second contact portion of the conductor has a curved belt shape extending in a longitudinal direction of the flash discharge tube.

2. A strobe device comprising:
a flash discharge tube having an anode on one side thereof and a cathode on another side thereof;
a conductive reflector composing a trigger external electrode, the trigger external electrode being in contact with a part of the flash discharge tube and storing the part;
a trigger coil having a hollow core, and a primary winding and a secondary winding wound around the core; and
a conductor connecting the secondary winding of the trigger coil and the reflector,
wherein
the trigger coil has an end of the flash discharge tube inserted into the core, and includes, at an end thereof adjacent to the reflector, a secondary terminal connected to the secondary winding;
the reflector has a bottom in contact with an outer peripheral surface of the flash discharge tube, the outer peripheral surface covering at least a region extending from the anode to the cathode;
the conductor has a first contact portion in contact with the secondary terminal of the trigger coil, and a second contact portion in contact with the bottom of the reflector;
the cathode of the flash discharge tube includes a metal sintered body at an end thereof; and
the flash discharge tube is inserted at a portion thereof into the core of the trigger coil, the portion being on the cathode side of the flash discharge tube and not including the metal sintered body.

3. The strobe device of claim 2, wherein the bottom of the reflector is disposed to further cover the metal sintered body of the flash discharge tube.

4. A strobe device comprising:
a flash discharge tube having an anode on one side thereof and a cathode on another side thereof;
a conductive reflector composing a trigger external electrode, the trigger external electrode being in contact with a part of the flash discharge tube and storing the part;
a trigger coil having a hollow core, an end surface, and a primary winding and a secondary winding wound around the core; and
a conductor connecting the secondary winding of the trigger coil and the reflector,
wherein
the trigger coil has an end of the flash discharge tube inserted into the core, and includes, at the end surface of the trigger coil adjacent to the reflector and non-parallel to a central axis of the flash discharge tube, a secondary terminal connected to the secondary winding;
the reflector has a bottom in contact with an outer peripheral surface of the flash discharge tube, the outer peripheral surface covering at least a region extending from the anode to the cathode; and
the conductor has a first contact portion in contact with the secondary terminal of the trigger coil, and a second contact portion in contact with the bottom of the reflector.

5. The strobe device of claim 4, wherein the conductor has the first contact portion which contacts with the secondary terminal of the trigger coil directly above the flash discharge tube, and the second contact portion in contact with the bottom of the reflector.

6. The strobe device of claim 4,
wherein the flash discharge tube has the cathode with a metal sintered body at an end of the cathode and on another side thereof; and
wherein a portion of the flash discharge tube which contains the metal sintered body remains outside of the core.

* * * * *